TUNNEL DIODE NEURISTOR PARITY GENERATOR

Filed April 13, 1964 2 Sheets-Sheet 1

CARL ANDREW BUDDE,
INVENTOR.

BY HIS ATTORNEYS.
Spensley & Horn.

TUNNEL DIODE NEURISTOR PARITY GENERATOR

Filed April 13, 1964 2 Sheets-Sheet 2

CARL ANDREW BUDDE,
INVENTOR.

BY HIS ATTORNEYS.

Spensley & Horn.

United States Patent Office 3,354,431
Patented Nov. 21, 1967

3,354,431

TUNNEL DIODE NEURISTOR PARITY GENERATOR

Carl Andrew Budde, Glendale, Calif., assignor to Electronic Specialty Co., Los Angeles, Calif., a corporation of California Filed Apr. 13, 1964, Ser. No. 359,152
7 Claims. (Cl. 340—146.1)

ABSTRACT OF THE DISCLOSURE

This invention relates to a computer logic system involving the use of tunnel diodes in neuristor type circuit configurations for generating parity bits in parallel. It involves the employment of a neuristor refractory circuit array of a predetermined time delay to which is applied in parallel a digital word of a predetermined number of bits and which there is propagated a signal in response to the receipt of a predetermined signal while of a particular level and wherein a signal of a different predetermined level does not result in a propagation of a signal.

*Background of the invention*

This invention relates generally to computer logic elements and more particularly to a novel parity generator utilizing tunnel diodes in neuristor types of circuit configuration.

A parity generator is employed in digital computing systems to develop a pulse indicative of whether there is an odd or an even number of bits in a digital word of interest.

In the prior art in order to accomplish the parity bit generations it was necessary to use a number of AND gates and an OR gate, or, by dissociating the digital word into groups of bits, AND gates were used in conjunction with half adder elements. In the latter technique fewer components are used. For example, in a typical six bit word sixteen AND gates and one OR gate are necessary for the parity bit generation. By breaking the word into two groups, each of 3 bits, six AND gates and one half-adder are used in the parity bit generation.

The disadvantage of these prior art techniques lies in the fact that in addition to the large number of gates it is also necessary that the inverse state of each bit be available. That is if the parity determination is being made on "ones" the "zeros" must also be available. Not all bit generating systems produce an inverse state counterpart along with each bit.

This invention contemplates means for generating parity bits in parallel, the operation being performed by novel circuit configurations using tunnel diodes in conjunction with a bistable counter stage. The novel arrangement concerned herein is contemplated to be in circuit elements which have been called neuristors.

The neuristor has been described in the literature of this subject matter as an electronic circuit element in which there is attenuationless propagation of an impulse applied thereto. The propagation proceeds in the circuit from the input end to the output end without loss. The name neuristor is derived from the analogy of the circuit operation to propagation of nerve impulses or stimuli. The nerve propagates an impulse on an "all or none" basis so long as sufficient triggering energy is available in the stimulus. As is well-known to physiologists nerves have particular stimulation thresholds which must be achieved before the stimulus can result in an appropriate propagation on the nerve fibre. Once "triggered" the "circuit" is not available for a successive impulse until some "refractory period" has passed. The refractory period is the recovery time.

The neuristor therefore is a threshold sensitive device which after external stimulation of sufficient amplitude will propagate without attenuation, a pulse, follows by a refractory period. The refractory period is the delay before the circuit will accept or respond to a succeeding stimulating pulse. In this disclosure individual circuit modules responding in the manner above described will be called neurons.

The advantages to be achieved by the new parity bit generator described herein are that for any particular digital word there are fewer parts required; the complement of each bit (that is, the inverse counterpart) is not required to determine parity; and if the word length is to be increased in number of bits the system of this invention is readily expanded.

Accordingly, it is an object of this invention to provide a novel parity bit generator for computer logic systems.

It is a further object of this invention to provide a parity bit generator incorporating tunnel diodes in neuristor circuit configurations.

It is another object of this invention to provide in a parity bit generator refractory logic.

It is still another object of this invention to provide a neuristor parity bit generator wherein there is no need for the complement of each bit in the digital word of interest, to determine parity.

It is an even further object of this invention to provide a circuit configuration, like neurons in the operation thereof, wherein a stimulus of sufficient amplitude will result in an attenuationless propagation of an impulse in the circuit from end to end to produce an output pulse and following which there will be a predetermined refractory period before the next pulse can achieve propagation on that circuit.

These and other objects will become more clear from the specification which follows wherein a preferred embodiment of the invention is described, but which is not to be construed as limiting the invention to the embodiment or embodiments so described; taken together with the accompanying drawings and the appended claims.

Figure 1:
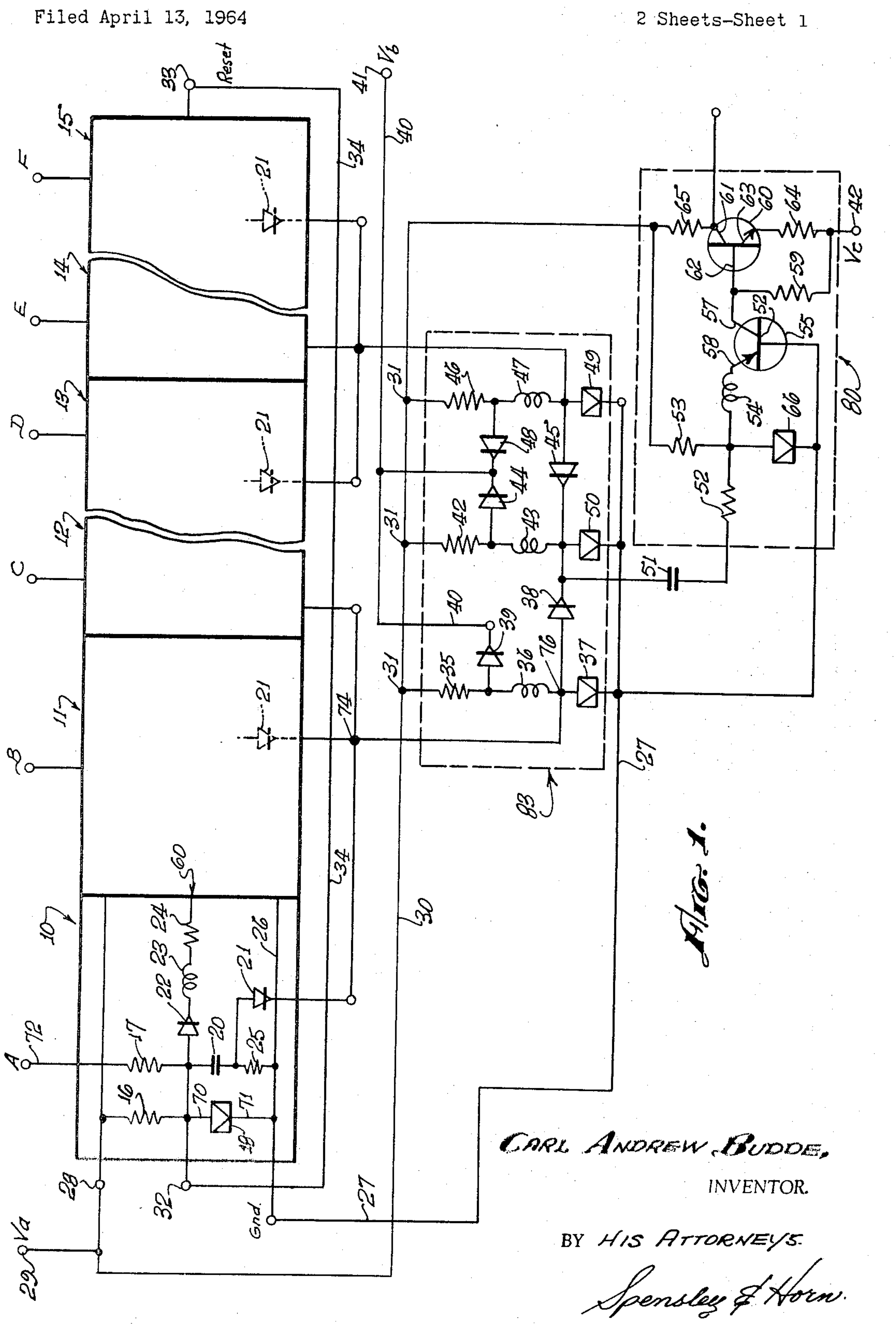
FIGURE 1 is a partially schematic and partially block circuit diagram of an embodiment of the invention.
Figure 2:
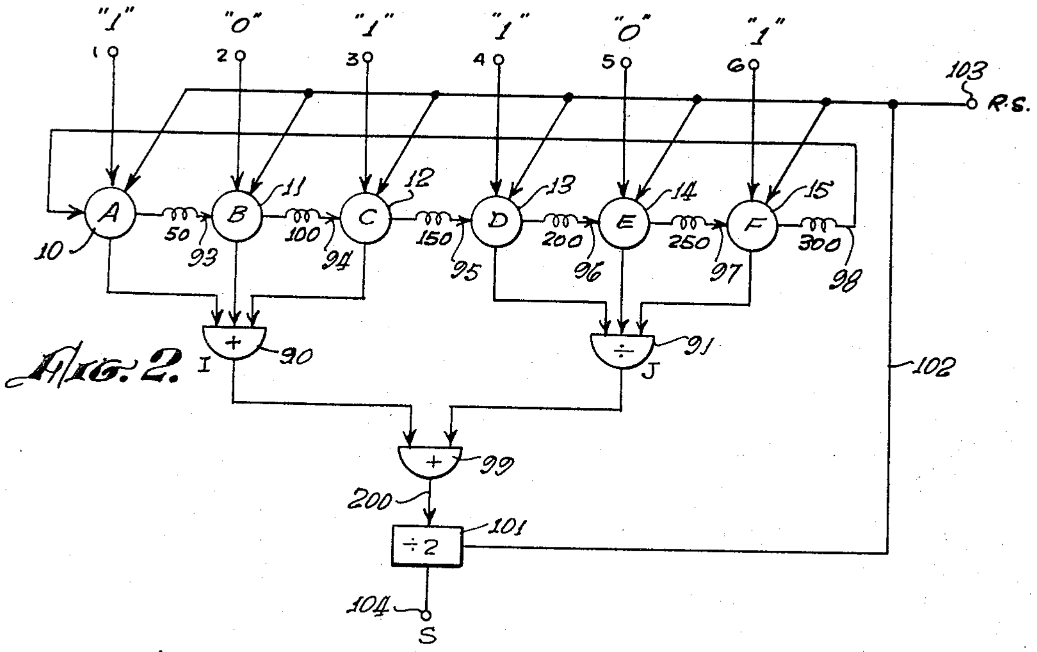
FIGURE 2 is a schematic circuit to show features of the invention employed in a logic system.

The invention hereinbelow set forth may be described as a neuristor tunnel-diode parity generator. As illustrated in the FIGURES 1 and 2 and described below an embodiment of the invention employed for a digital word of six bits has been used. It is to be understood that the choice of six bits for the illustrative example in FIGURES 1 and 2 is only one of many other multi-bit words of more or less than six bits that may reasonably also have parity bit generation means according to the invention applied to them.

In essence, the invention employs tunnel diodes in a neuristor refractory circuit array of predetermined time delay here chosen for illustration at 300 nanoseconds. To the neuristor circuit a digital word of some number of bits (here six) is applied in parallel. Upon receipt of a "1" neuron cell of the circuit array so excited propagates along the array line. The propagation continues for the refractory period. While a neuron is so excited by a "1" a successive pulse cannot and so will not excite it, but if an adjacent neuron cell is in a zero state the bit will be transmitted to the adjacent unexcited cell after some delay to produce an output. For example, if the bits of a six bit word 101101 have been applied respectively to the six neuron cells simultaneously and the cell and bit relationship is as tabulated below:

Bits 1 0 1 1 0 1
Neurons A B C D E F then only neurons A and D are free to transfer a bit to an adjacent cell: A to B and D to E. C cannot transmit to D because both are in the "1" or propagating condition but D can transmit to E or A to B since E and B are in the "0" or non-propagating condition and capable of switching and delivering an output pulse.

Figure 3:
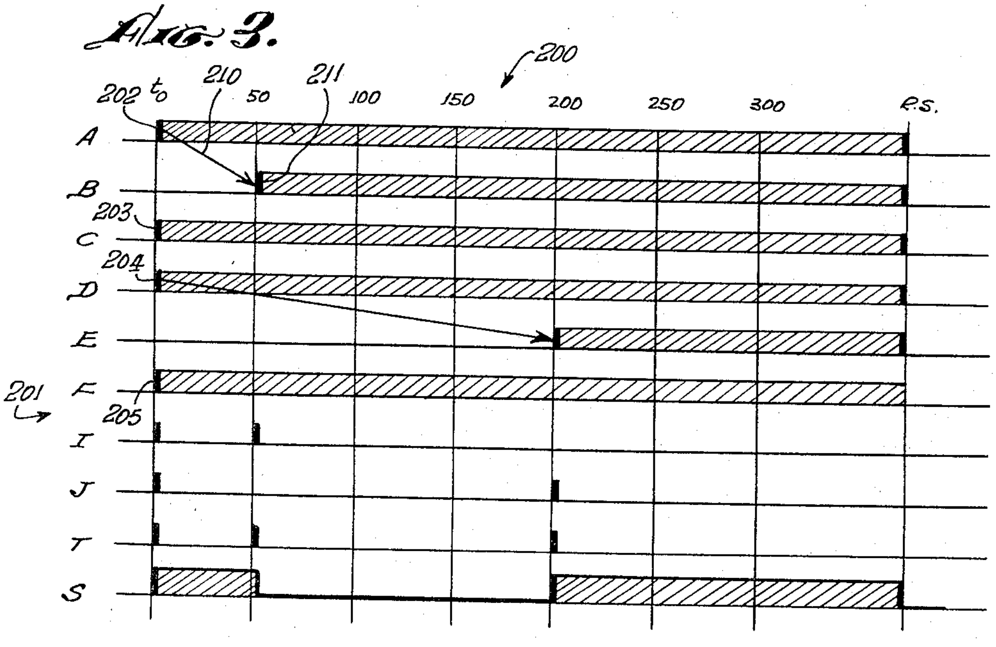
FIGURE 3 is a wave form timing chart related to FIGURE 2 showing pulse relationships in the operation of circuits according to this invention.

Using the illustration refractory period of 300 nanoseconds for propagation along the neuron refractory path the transfer A to B will occur at 50 nanoseconds after $t_0$, see FIGURE 3, the instant of application of the six bit digital word, and the transfer D to E will occur 200 nanoseconds after $t_0$. Each such transfer is followed by an output pulse applied to an OR gate.

The outputs of the six cells are applied in two groups of three to two OR gates. The OR gates are coupled to another OR gate which in turn feeds a counter which produces a "1" output pulse for every two received thus an even number of bits in the transfer outputs of the neuron cell block produces a "one" output pulse or bit from the counter. An odd output of the neuron cell block is indicated by the "zero" output of the counter.

The "one" or "zero" output of the counter is the seventh or parity bit of a seven bit word. A "1" in the seventh or parity bit position indicates an even number of "ones" in the remainder of the word. A "0" in the seventh or parity bit position indicates an odd number of "1's" in the remainder of the digital word.

The illustrative example hereinabove given for a seven bit word wherin six bits are the intelligence bits and the seventh is a parity bit generated according to this invention which may be seen to have been accomplished without resort or need for the existence of a complement or inverse to each of the six bits whether a "1" or "0."

In FIGURE 1 to which reference is now made there is shown a cascaded assembly of neurons 10–15 of which 10 is shown in complete circuit from and the remainder in block form. Blocks 11–15 inclusive each has a circuit like that detailed in 10 and described hereinbelow.

A resistor 16 is connected between a potential source 29 by line 28 and a terminal 70 of a tunnel diode 18. A resistor 17 is connected between an input terminal 72 (identified as A) and tunnel diode input at 70. A capacitor 20 and a resistor 25 are connected in series between 70 and ground line 26. A tunnel rectifier 21 is connected as a coupling element between the junction of capacitor 20 and resistor 25 to a common output line 74. Another tunnel rectifier 22 is used as a coupling element in series with an inductor 23 and a resistor 24. The series combination 22, 23, 24 is connected with the input 60 of the succeeding neuron module 11 from line 70 of tunnel diode 18. Tunnel diode 18 is grounded by line 71 to ground line 26.

In each of neuron modules 11–15, collectively forming a neuron module array all of the elements described in the above preceding paragraph are also found in the identical circuit configurations shown and described in neuron module 10. The output of module 15 at 33 connects by line 34 back to input 32 of module 10 as a reset path.

The common ouput line 74 from modules 10–11–12 is connected to a junction 76 between an inductor 36 and a tunnel diode 37 and a coupling tunnel rectifier 38. The other side of tunnel diode 37 is connected to ground line 27. The other end of tunnel rectifier 38 is connected to an output coupling capacitor 51. A resistor 35 is connected between a junction of a clamp tunnel rectifier 39 with inductor 36 and a point 31 connected with source of potential 29 on line 30.

A circuit configuration of elements 46, 47, 48, 49, and 45 corresponds identically but in mirror image to the circuit formed by 35, 36, 37, 38, and 39. A similar circuit 42, 43, 44, and 50 joins both coupling rectifiers 38 and 45 to connect with an output capacitor 51.

At junction 80 an output line is provided from a common output connection 81 from neuron modules 13, 14, and 15 which corresponds to output junction 74 for modules 10–11–12.

Output line 78 through capacitor 51 couples through isolation resistor 52 to the junction of a switching tunnel diode 66, resistor 53 and inductor 54. Inductor 54 is connected to the emitter of the grounded base 52 of a PNP transistor 55. The collector 57 of transistor 55 is directly connected to the base 62 of an NPN transistor 60. A bias resistor 59 is connected to a source of bias potential 82. Emitter 63 of transistor 60 is connected through bias resistor 64 to bias source 82. The collector 61 of transistor 60 is connected through collector load resistor 65 to potential source terminal 29 through line 30.

The configuration outlined in box 80 (described here) is a counter circuit.

The configurations outlined in box 83 (dotted line) are OR gates.

The circuit shown in FIGURE 2, to which reference is now made, is related to the timing wherefrom diagram of FIGURE 3. On the horizontal scale 200 of the chart in FIGURE 3 propagation time in nanoseconds is set forth.

The vertical identifies (201): A to F, I, J, T and S refer to the similarly identified elements in FIGURE 2. A to F corresponds to the neuron cell elements previously discussed.

The chart shows an initiating pulse at $t_0$ at A, C, D, and F (202–205) which may be considered in the "1" state. The pulse is propagating in lines A, C, D, F so that if C were to transmit to D, D is already in the refractory region (that is propagating) and no longer capable of switching. However, A can switch to B after 50 nanoseconds and D to E after 200 nanoseconds so the output of T now has 3 pulses as to $t_{50}$ and off at $t_{200}$. Reset occurs after $t_{300}$.

In FIGURE 2 a block logical schematic of the parity generator is shown. A six bit pulse 101101 is shown as applied to inputs 1 through 6 to neuron modules A through F corresponding to 10–15 of FIGURE 1 between each module is a delay line 93–98 each having an increased delay of 50 nanoseconds over the preceding module. The cumulative delay time being indicated on each delay line 93–98. The delays are as follows:

A to B 50 ns.
A to C 100 ns.
A to D 150 ns.
A to E 200 ns.
A to F 250 ns.
F to reset 300 ns.

OR gates I (90) and J (91) receive pulses if present from A, B, C, and D, E, F, respectively, producing an output which is applied to OR gate T (99) which produces an output pulse on line 100 to a counter 101 which produces 1 pulse for each two it receives from I or J. In fact, I and J were added for redundant reliability enhancement. A single OR gate replacing I, J, and T, receiving all six outputs 21 from A–F at once works equally well but with greater numbers of pulses there is a statistical probability of error. The input of each neuron has a connection to the reset output of the system at 103 by lines 102. Counter 101 is also reset on line 102. 104 is the output of counter 101.

Thus, the six digital bits 101101 applied at the input of the parity bit generator of this invention produce an output of the six bit plus a seventh, the output of counter 101. If there is an even number of "1's" in the binary number (101101 has an even number of "1's") then the counter 101 puts out a "1" making the number now 1101101.

A general description of the operation of the devices of this invention has previously been given above. With reference to FIGURES 1, 2, and 3 taken together the operation may be described in more detail as follows:

At starting time $t_0$ a six bit digital word is applied to neurol modules 10–11–12–13–14–15, inputs A, B, C, D, E, F, of the parity generator of this invention as illustrated in FIGURE 1, A, B, C, D, E, are like input terminals (such as 72) respectively. Resistor 17 acts as isolation and current limiting resistor to limit the pulse input current to tunnel diode 18 at lead 70 thereof. Tunnel diode 18 is biased from source of bias potential $V_a$ at 29 through load resistor 16.

Two output circuit connections 20, 21, 25, and 22, 23, 24 are provided at input terminal line 70 of tunnel diode 18. The other end of tunnel diode 18 goes to ground.

Output 20, 21, 25 is obtained from capacitor 20. Resistor 25 is the output load.

Output 22, 23, 24 constitutes an output coupling to the succeeding neuron module 11. Tunnel rectifier 22 acts to minimize interaction between its neuron cell 10 and the next succeeding cell 11.

Inductor 23 is a delay element and resistor 24 an output current limiting and isolation element coupling cell 10 to cell 11.

At $t_0$ upon application of the six bit pulse group with, for example, a binary appearance of A B C D E F (neuron cells)
1 0 1 1 0 1 (binary input)

as may be seen in FIGURE 3.

At time $t_0$ (see 202, FIGURE 3), module 10 (A) becomes active and propagates (202, FIGURE 2) along the path 17–22–23 to successive neuron modules 11–15, at intervals of 50 nanoseconds. Since B is in the zero state, at time $t_{50}$ when the pulse of module 10 passes along the line 22, 23, 24, 50 time units after $t_0$, module 11 switches, sending a pulse out of its tunnel rectifier coupler 21 to junction 74 where it applied to the first OR gate formed by diode 37, inductor 36, resistor 35, and clamping diode 39. (See 210, 211, FIGURE 2.)

Pulse "C" also a "1" starts propagating at time $t_0$ and cannot transfer to D because D is also propagating having started at $t_0$ (see 204). D, however, can trip a next adjacent pulse bit because E is in a "0" state. The tripping of E by D occurs at $t_{250}$ because of the delays in the system previously described.

Thus, at the output of T (99, FIGURE 2) there are 3 pulses at $t_0$, $t_{50}$, $t_{200}$. $t_{50}$ pulse and $t_{200}$ reset and set the ÷2 counter. If the first pulse is considered an even indication then the state of the ÷2 counter 101 (FIGURE 2) after the sum of the delay periods (here 1050 ns.) determine the parity. The one state of counter 101 is even and a zero state is odd.

As an example, if "E" (neutron 14) had been in the 1 state only two pulses would have passed through OR gate "T" (99, FIGURE 2) and the ÷2 counter 101 would in the zero state indicating an odd number of ones in the six bits: 101111. In practice the neuron modular 10–15 are biased for bi-stable operation while the OR gates 90, 91, 99 are monostable. As has been described above OR gates 90, 91, 99 are triggered by the output of neuron modules 10–15.

The operation of counter shown in the dashed outline 80 may be described as follows. Each pulse (in the "high" state) generated by tunnel diode OR gate 42, 43, 50 (FIGURE 1) corresponding to 99 of FIGURE 2 causes tunnel diode 66 to flip, driving a transistor output chain. Tunnel diode 66 in combination with grounded base coupler transistor 55 performs the divide by 2 function by changing state with each pulse out of OR gate 99. NPN transistor 60 amplified the output pulse and provides an output at 84.

There has been described herein a novel parity bit generator which incorporates a multistage delay network of fixed delay per stage cumulating the delays to form a refractory period. Each stage of the network is a tunnel diode neuristor circuit which has been called a neuron module herein. When a multibit digital word is applied to the parity generator by virtue of the neuron cell active and an output applied to a pair or array of OR gates by two groups of the neuron cells, and these OR gates in turn supplying their pulses to a third OR gate which in turn drives a counter, a parity bit may be generated which will identify the presence of an odd or even number of "ones" in the digital word driving the neuron module.

What is claimed as new is:

1. A parity bit generator comprising:

a tunnel-diode neuron module array having an input on each said neuron module in the array adapted to receive a respective digital bit in a digital word and each module in the array having output means;

OR gate means connected to said output means of said array and adapted to generate predetermined output pulses in response to the binary digital state of said bits in said digital word;

counter means having two states and being connected to said OR gate means and being responsive to said output pulses of said OR gate means to produce one bit for each two of said OR gate output pulses, the bit in one state of said counter means is indicative of an odd number of ones in said digital word and the bit in the other state of said counter means is indicative of an even number of said ones.

2. The parity bit generator defined in claim 1 wherein a delay line of predetermined delay characteristic is interposed between each said neuron module to impart a characteristic delay in the propagation of said digital bits through each neuron module.

3. The parity bit generator defined in claim 1 wherein delay means are interposed between adjacent ones of each said neuron modules in said array so as to establish a predetermined propagation interval in the transit of a bit through said array.

4. The parity bit generator defined in claim 1 wherein delay means are interposed between adjacent ones of said neuron modules and a single additional one of said delay means is coupled between the last of said neuron modules and the first of said neuron modules thereby to reset the parity bit generator following a use thereof.

5. In a parity bit generator:

a neuron module array having predetermined delay interval generators interposed between each adjacent pair of modules in said array for establishing a predetermined propagation delay said array having an input means and an output means;

input-output intercoupling means in said array adapted to reset the array, said input-output intercoupling means connected between said input and said output of said array, and being responsive to the end of said predetermined delay interval to reset said array after said predetermined delay interval has elapsed.

6. An interconnected array of tunnel-diode neuristor modules;

a plurality of delay networks interposed between adjacent ones of said tunnel diode neuristor modules;

an array of gates at least one of said gates being coupled with one half of the number of modules in said array, another of said gates coupled to the remainder of said modules in said array, said gates being responsive to pulses developed in said modules to develop an output pulse indicative of whether the number of ones in a digital word applied to said array is odd or even.

7. A parity bit generator comprising;

a neuron module array for receiving a parallel group of digital bits said array having a predetermined interval delay characteristic related to an adjacent module in said array to develop an output pulse after said characteristics; delay gate means coupled to said array and being responsive to respective ones of said modules to develop an output pulse when each said module is excited, and not thereafter until said predetermined characteristic delay interval has passed; and counting means coupled with said gate means and being adapted to respond to said output pulses developed by said gate means to produce a parity pulse which becomes an additional bit in said group of digital bits, the state of said parity pulse being indicative of whether said group of digital bits has an odd or even number of ones.

References Cited

UNITED STATES PATENTS 3,200,242 8/1965 Crawford et al. -- 340—146.1 X

OTHER REFERENCES

Pedelty, M.: "Neuron Technology," Control Engineering, May 1962, pp. 115–119.

MALCOLM A. MORRISON, *Primary Examiner.*

M. J. SPIVAK, V. SIBER, *Assistant Examiners.*